(12) United States Patent
Nahum et al.

(10) Patent No.: US 7,432,496 B1
(45) Date of Patent: Oct. 7, 2008

(54) ENCODER SCALE WRITING OR CALIBRATION AT AN END-USE INSTALLATION BASED ON CORRELATION SENSING

(75) Inventors: Michael Nahum, Kirkland, WA (US); Joseph D. Tobiason, Woodinville, WA (US)

(73) Assignee: Mitotoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/829,715

(22) Filed: Jul. 27, 2007

(51) Int. Cl.
*G01B 11/00* (2006.01)
*G06K 9/82* (2006.01)

(52) U.S. Cl. ............... 250/231.13; 250/234; 250/208.1; 356/614; 356/617; 382/278

(58) Field of Classification Search ............... 250/208.1, 250/234, 231.13, 231.14, 231.16, 221; 356/614–617, 356/619, 622; 382/278, 287, 289, 294
See application file for complete search history.

(56) References Cited

U.S. PATENT DOCUMENTS

| 485,545 | A | 11/1892 | Holt |
| 4,950,890 | A | 8/1990 | Gelbart |
| 6,664,506 | B2 | 12/2003 | Clauer |
| 6,873,422 | B2 | 3/2005 | Nahum |
| 6,955,412 | B2 | 10/2005 | Hin |
| 7,065,258 | B2 | 6/2006 | Nahum |
| 7,085,431 | B2 | 8/2006 | Jones |
| 2003/0024658 | A1* | 2/2003 | Nahum ............... 382/106 |
| 2007/0051884 | A1 | 3/2007 | Romanov |

* cited by examiner

*Primary Examiner*—Kevin Pyo
(74) *Attorney, Agent, or Firm*—Christensen O'Connor Johnson Kindness PLLC

(57) ABSTRACT

A method for writing or calibrating the scale of a scale-based position encoder. The scale is installed where it will be used to provide ongoing position measurements for a host system. The image correlation sensor is temporarily mounted proximate to the mounting position of the scale-based position encoder readhead on the host system, and is moved along the measuring axis relative to the scale, to provide corresponding displacement measurement information. The displacement measurement information is used to govern a scale writing process or a calibration process for the scale-based position encoder, such that the displacement measurement information at least partially governs the values of respective ongoing position measurements provided by the scale-based position encoder at respective positions along the measuring axis. A two-axis image correlation displacement sensor is advantageously used to detect and/or corrected various potential errors during the calibration or writing process.

16 Claims, 7 Drawing Sheets

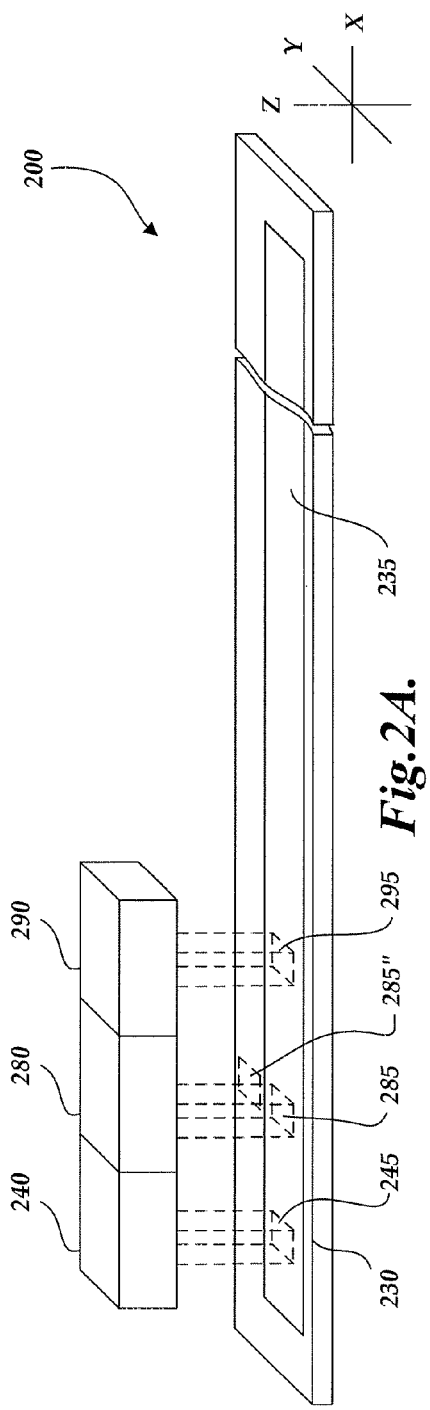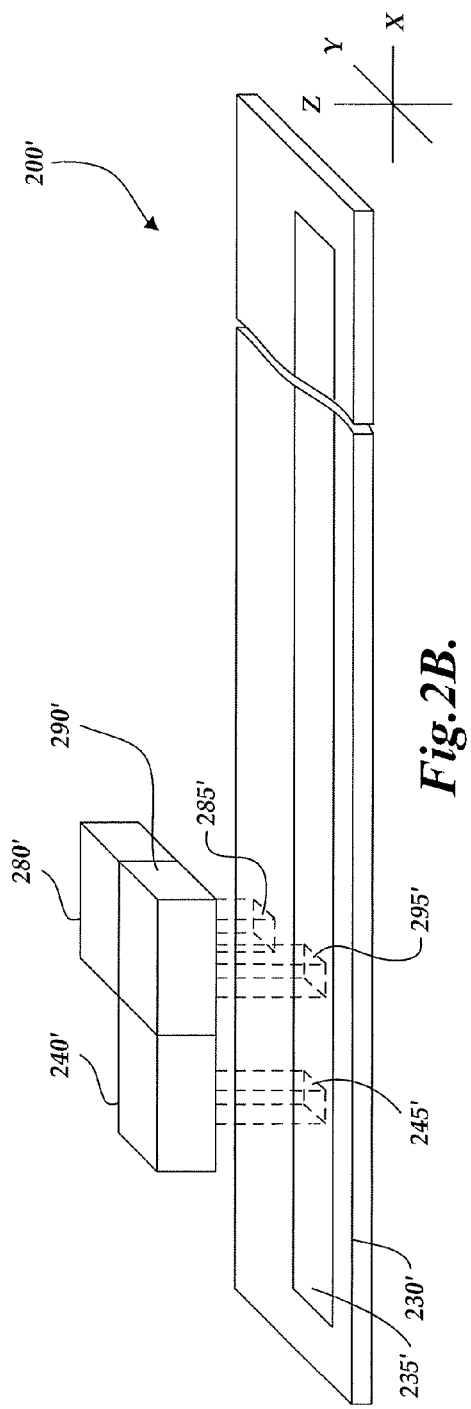

ENCODER SCALE WRITING OR CALIBRATION AT AN END-USE INSTALLATION BASED ON CORRELATION SENSING

BACKGROUND

The invention relates generally to metrology systems, and more particularly to a system for writing or calibrating an encoder scale at an end-use installation.

U.S. Pat. No. 4,950,890, which is hereby incorporated herein by reference in its entirety, discloses a method and apparatus for writing position markings onto a blank encoder scale at an end-use installation, where the encoder scale and an associated read/write head will be used to monitor the position of a moving part. The '890 patent teaches that an accurate position transducer such an interferometer is used to directly measure the position of a selected portion of the moving part and to command the encoder read/write head to write position marks on the blank encoder such that they correspond to the actual position of the selected portion of moving part. The '890 patent teaches that imperfect bearings systems and other errors sources generally cause discrepancies between conventional encoder position measurements and the actual positions of moving parts that they are intended to monitor. By writing an encoder scale as outlined above, it is intended that the encoder scale incorporate scale distortions that automatically compensate for such sources of errors.

However, the method of the '890 patent has various disadvantages in various applications. Misalignment of the interferometer or other reference relative to the motion axis may cause the scale to be written with an improper scale factor. In many applications, accurately aligning an interferometer or other accurate position reference with the actual motion axis, as well as with a desired portion of the moving part, may be uneconomical, may require skills beyond those of a typical end user, and/or may be impractical due to space constraints, or the like. In addition, depending on the internal configuration of the encoder read/write head and its nominal alignment relative to the scale, the effective writing path or writing angle between the readhead writing element and the scale may generally vary from the effective reading path or reading angle between the readhead reading element and the scale. In such a case, dynamic misalignments between the readhead and scale, such as a changing gap or angle due a scale that is not flat, or the like, may introduce encoder-related errors that are not compensated for by the method of the '890 patent. An improved method for writing or calibrating an encoder scale at an end-use installation that overcomes these and other disadvantages, either individually or in combination, would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus are provided for writing or calibrating the scale of a scale-based position encoder at an end-use installation, using an image correlation displacement sensor. In general, an end-use installation means an installation of the scale-based position encoder on an end-use host system, regardless of the whether that host system is located at a factory or at an end-user location. In accordance with one aspect of the invention a scale-based position encoder that provides ongoing position or displacement measurements comprises at least a scale and an encoder readhead that provides position or displacement measurement signals that depend on the relative position between the encoder readhead and marks on the scale. The scale of the scale-based position encoder is installed where it will be used to provide ongoing measurements of the relative displacement between two members of a host system along a measuring axis direction. An image correlation displacement sensor is temporarily mounted proximate to a mounting position where the readhead of the scale-based position encoder will be used to provide the ongoing displacement measurements. The image correlation displacement sensor is moved relative to the scale along the measuring axis direction by providing relative displacement between the two members of the host system. The image correlation displacement sensor provides displacement measurement information corresponding to the relative motion, and the displacement measurement information is used to govern at least one of a scale writing process and a scale calibration process for the scale-based position encoder, such that the displacement measurement information provided by the image correlation displacement sensor at least partially governs the values of respective ongoing position measurements that are determined based on the displacement measurement signals provided by the encoder readhead of the scale-based position encoder at respective positions along the measuring axis.

In some embodiments, a scale writer is mounted proximate to the scale and proximate to the mounting position where the readhead of the scale-based position encoder will be used to provide the ongoing displacement measurements, and displacement measurement information provided by the image correlation displacement sensor is used to govern the scale writer during a scale writing process that applies marks to a scale comprising a writable scale track. In some embodiments, the marks are applied to a blank scale. In some embodiments, the marks are applied to a scale that includes prefabricated markings.

In some embodiments, calibration information is determined based on displacement measurement information provided by the image correlation displacement sensor and/or displacement measurement signals provided by the provided by the scale-based encoder readhead. The calibration information may be stored a calibration memory associated with the scale-based position encoder and later used to correct respective raw position measurements that are determined based on the displacement measurement signals provided by the encoder readhead, in order to provide corrected values for ongoing position measurements.

In accordance with a further aspect of the invention, in various embodiments, a 2-axis image correlation displacement sensor is used. In some embodiments, the 2-axis displacement measurement information is used to determine the displacement of the image correlation displacement sensor along the measuring axis direction, such that the 2-axis image correlation displacement sensor need not be precisely aligned with the measuring axis direction in order to provide accurate displacement measurements along the measuring axis direction. In some embodiments, information from the 2-axis image correlation displacement sensor is used to determine its translation and orientation path during a relative displacement, and the information determined based on the translation and orientation path is used to determine and/or correct certain potential errors that may otherwise arise due to dynamic misalignments at various positions along the measuring axis.

In some embodiments, the image correlation displacement sensor may be used to provide at least one of one of speckle images and real images (that is, photographic-like images) of a surface, which may include any markings thereon. In some embodiments, the image correlation displacement sensor may be configured to provide speckle images at one time and provide real images at another time.

In accordance with a further aspect of the invention, in some embodiments, the readhead of the scale-based position encoder or an associated mounting, and the image correlation displacement sensor or an associated mounting, include features that allow the image correlation displacement sensor to be readily aligned and temporarily fixed proximate to the mounting position where the readhead of the scale-based position encoder will be used to provide the ongoing displacement measurements. In various embodiments the image correlation displacement sensor is temporarily attached to the scale-based position encoder or its associated mounting, and is not directly attached to a member of the host system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2A is a diagram of a second embodiment of a mounting arrangement according to this invention, comprising an image correlation displacement sensor correlation encoder mounted in conjunction with a scale-based position encoder and a scale writer;

FIG. 2B is a diagram of a third embodiment of a mounting arrangement according to this invention, comprising an image correlation displacement sensor correlation encoder mounted in conjunction with a scale-based position encoder and a scale writer;

DETAILED DESCRIPTION

Figure 1:
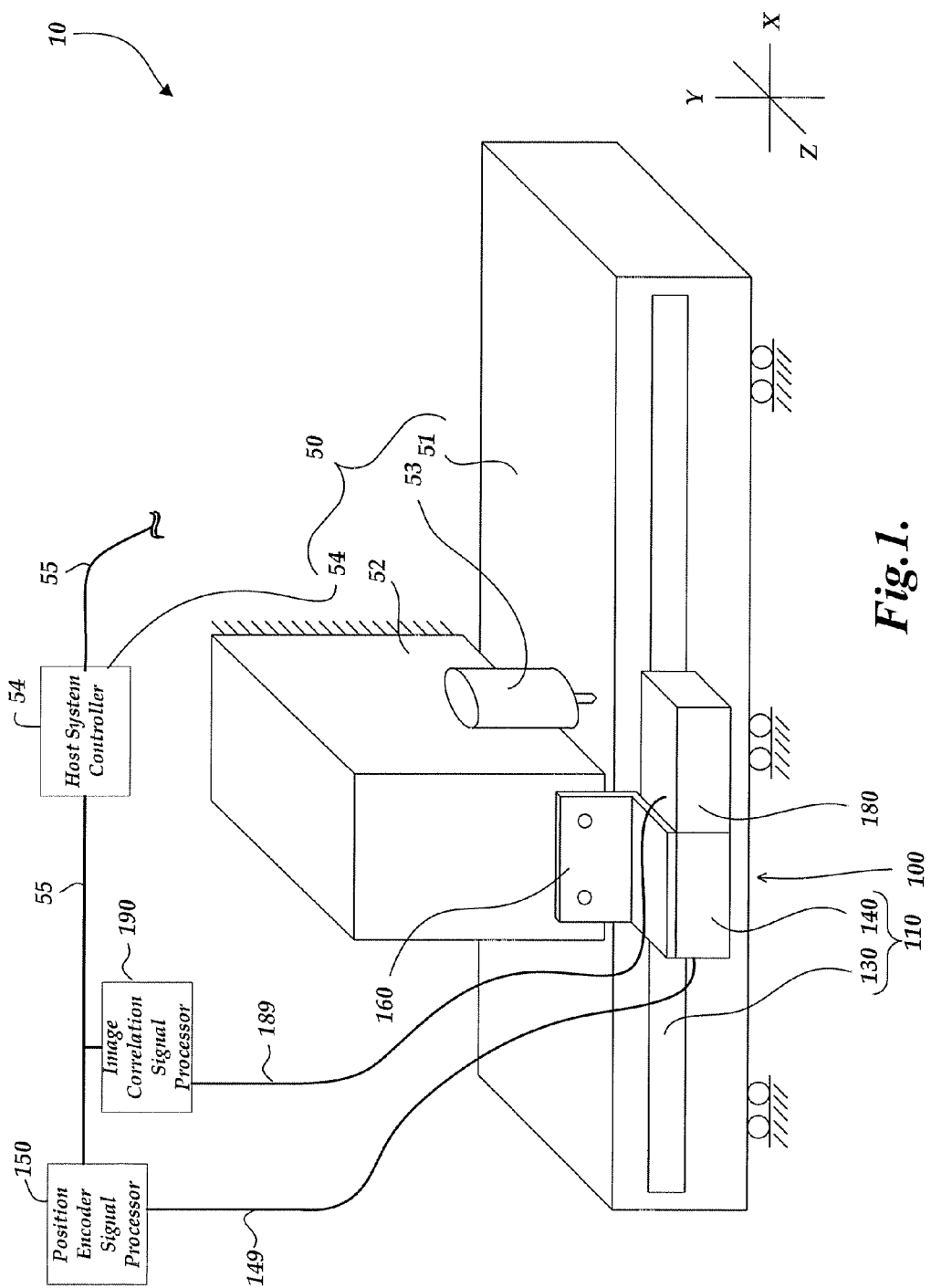
FIG. 1 is a diagram of an end-use installation including a first embodiment of a mounting arrangement according to this invention, comprising an image correlation displacement sensor mounted in conjunction with a scale-based position encoder on a host system.

FIG. 1 is a diagram of an end-use installation including a system 10 according to this invention. The various elements of FIG. 1 are not drawn to scale. The system 10 includes a first mounting arrangement 100 according to this invention comprising an image correlation displacement sensor 180 mounted in conjunction with a scale-based position encoder 110 on an end-use host system 50 (e.g., a machine tool system). The host system 50 generally includes a moveable member 51, a fixed member 52, and a host system controller 54, which controls the relative motion between the members 51 and 52, as well as other aspects of the operation of the host system 50 (e.g., the tool element 53 attached to the fixed member 52). A host power and signal connection 55 (e.g., a wired power and signal bus) connects to various elements of the host system 50 as well as a position encoder signal processor 150.

The scale-based position encoder 110 comprises a scale 130 and an encoder readhead 140 connected to the position encoder signal processor 150 (e.g., by the power and signal connection 149). In some embodiments, the position encoder signal processor 150 may be merged with the encoder readhead 140. In some embodiments, the position encoder signal processor 150 may be merged with and/or provided by the host system controller 54. In the embodiment shown in FIG. 1, the encoder readhead 140 is mounted to the fixed member 52 by an encoder readhead mounting element 160.

The image correlation displacement sensor 180 is connected to an image correlation signal processor 190 (e.g., by the power and signal connection 189), to form an image correlation displacement measuring system. In some embodiments, the image correlation signal processor 190 may be merged with the image correlation displacement sensor 180. In some embodiments, the image correlation signal processor 190 may be connected to the host system power and signal connection 55 and/or to the position encoder signal processor 150. In some embodiments, the image correlation signal processor 190 may be wholly or partly provided by hardware and/or signal processing and/or image processing routines located in the host controller 54. In various exemplary embodiments, the image correlation displacement sensor 180 and the image correlation signal processor 190 may comprise any suitable combination of configurations and features described in U.S. Pat. Nos. 6,664,506; 7,065,258; 7,085,431; and 6,873,422, each of which is hereby incorporated herein by reference in its entirety. However, such configurations and features are exemplary only, and not limiting. In some embodiments, the image correlation signal processor 190 may include image processing circuits and/or routines that allow it to recognize and determine the positions and/or orientations of reference marks included in real images, or reference portions of real or speckle images that may be included in one or more images, as outlined further below. In some embodiments, the image correlation signal processor 190 may include circuits and/or routines that allow it to determine corrections or adjustments for the various potential errors outlined further below.

Regarding operation of the image correlation displacement sensor 180, in some embodiments, the image correlation displacement sensor may be configured to provide and correlate speckle images. In such embodiments, the image correlation displacement sensor 180 should be mounted such that during displacement it follows a track along a diffusely reflecting surface (e.g., a textured surface). In some embodiments the diffusely reflecting surface may be a surface of the host system 50 (e.g., a surface of the member 51). In other embodiments, it may be a diffusely reflecting track provided along the scale 130. In some embodiments, the image correlation displacement sensor may be configured to provide and correlate photographic images of a surface, which may include any markings thereon. In such embodiments, the image correlation displacement sensor 180 may be mounted such that during displacement it follows a track along a surface that includes contrasting features with a high enough spatial frequency content to allow correlation measurements with a desired resolution. The contrasting features may be inherent surface characteristics of a member of the host system or particular textured or printed features prefabricated along the scale 130. In some embodiments, the scale may includes a type of prefabricated markings that are imaged by a 2-axis image correlation displacement sensor, wherein the associated images are used for at least one of determining correlation measurements, determining a relative orientation between the readhead and the markings, determining a change in the relative orientation between the readhead and the markings, determining a repeatability of the displacement measurement information provided by the 2-axis image correlation displacement sensor, determining an accumulated error associated with the displacement measurement information provided by the 2-axis image correlation displacement sensor and reducing an accumulated error associated with the displacement measurement information provided by the 2-axis image correlation displacement sensor. In some embodiments, the image correlation displacement sensor may be configured to provide and correlate speckle images at one time and provide surface images, which may include any markings thereon, at another time.

In the embodiment shown in FIG. 1, the correlation displacement sensor 180 is mounted to the encoder readhead mounting element 160 or directly to the encoder readhead 140. Various mounting and alignment considerations are described in greater detail below.

An XYZ coordinate system is shown in FIG. 1. According to a convention used herein, the X-Y plane is generally approximately parallel to a surface plane of the scale 130 and the X-axis is aligned with the direction of relative displacement, which generally approximately coincides with the measuring axis direction of the scale-based position encoder 110 and the image correlation displacement sensor 180.

In some exemplary embodiments, the scale-based position encoder 110 may be of any known type that is suitable according to the principles of the invention described herein (e.g., a known optical, capacitive, inductive, or magnetic encoder), including a scale 130 that is completely prefabricated and operational. In various embodiments, the scale 130 may include a reference or index mark such that the encoder readhead may consistently determine the same position or accumulated displacement along the measuring axis, in relation to the reference or index mark. In such embodiments, the system 10 may be operated according to one embodiment of a calibration method according to this invention, as follows: The image correlation displacement sensor 180 is moved relative to the scale 130 along the measuring axis direction, by using the host system 50 to provide relative displacement along the X-axis the between the two members 51 and 52. During the relative displacement, the image correlation displacement sensor 180 provides displacement measurement information to the image correlation signal processor 190, corresponding to respective positions during the relative motion. Similarly, the encoder readhead 140 provides position measurement information to the position encoder signal processor 150 corresponding to the respective positions during the relative motion. The image correlation signal processor 190 determines respective position values for the respective positions. The scale-based position encoder 110 determines respective raw (that is, uncorrected) position values for the respective positions. The corresponding respective values from the image correlation signal processor 190 and the position encoder signal processor 150 are analyzed (e.g., their respective differences are determined at various positions), and related calibration information is stored in a calibration memory of the position encoder signal processor 150. Subsequently, the position encoder signal processor 150 corrects its raw position values using calibration information from the calibration memory, in order to determine its ongoing position measurements. In other embodiments, the host system controller may include processing circuits and/or routines and/or memory circuits that receive displacement measurement information from the image correlation signal processor 190 and the position encoder signal processor 150, determine the calibration information, store the calibration information, and correct raw position values, in order to determine ongoing position measurements. In either case, the displacement measurement information from the image correlation displacement measuring system at least partially governs the values of the ongoing position measurements, to improve their accuracy. Various types of errors that may be detected and reduced based on information provided by the image correlation displacement sensing system are described further below. The calibration information may be adjusted to account for any or all such errors.

In some exemplary embodiments, the scale-based position encoder 110 may be of a type disclosed in the incorporated '890 patent (e.g., an optical, or magnetic encoder), or the like. As disclosed in the '890 patent, such an encoder may include an encoder readhead 140 that is operable both in a write mode to write marks onto the scale 130 and in a read mode to provide position or displacement measurement signals that depend its position relative to marks on the scale 130. The scale 130 is of a type that may have marks written on it at an end-use installation location (e.g., the type of end-use installation shown in FIG. 1). In such embodiments, the system 10 may be operated according to one embodiment of a scale writing method according to this invention, as follows: A set of desired scale mark positions, which may include a reference or index mark position, is defined or provided. The image correlation displacement sensor 180 is moved relative to the scale 130 along the measuring axis direction, by using the host system 50 to provide relative displacement along the X-axis the between the two members 51 and 52. During the relative displacement, the image correlation displacement sensor 180 provides displacement measurement information to the image correlation signal processor 190, corresponding to respective positions during the relative motion. The image correlation signal processor 190 determines respective position values for the respective positions. When a respective position value corresponds to one of the set of desired scale mark positions, the readhead 140 is triggered in the write mode to write a mark onto the scale 130. This process continues until marks are written onto the scale 130 at all desired scale mark positions. Subsequently, the scale-based position encoder 110 determines ongoing position measurements based on the written scale marks. Thus, the displacement measurement information from the image correlation displacement measuring system governs the placement of the written marks on the scale, which at least partially governs the values of the ongoing position measurements. Various types of errors that may be detected and reduced based on information provided by the image correlation displacement sensing system are described further below. The marks written to the scale may written at positions that adjusted to account for any or all such errors.

Regarding one potential source of error associated with the invention, error accumulation may affect the accuracy of the displacement measurement information from the image correlation displacement measuring system. For a single pass along a measuring range, the number of required reference image updates N is approximately given by $$N = \frac{L}{L'/M} \quad \text{(Eq. 1)}$$

where L is the length of the measuring range, L' is approximately one-half of the dimension of the imaging array in the image correlation readhead along the measuring axis direction, and M is the readhead magnification of the image on the imaging array.

An image correlation displacement measuring system may exhibit a short range error that is periodic at the pixel pitch of its imaging array, having a peak error value of a fraction (1/n) of a pixel. The associated peak error value $\epsilon_{pp}$ in microns along the measuring axis direction is approximately $$\varepsilon_{pp} = \frac{1}{n}\left(\frac{P}{M}\right) \quad \text{(Eq. 2)}$$

where P is the pixel pitch of the readhead imaging array.

A total error $\epsilon_{total}$, assuming reference image updates are randomly located within the pixel pitch, may be approximately $$\varepsilon_{total} = \varepsilon_{pp} * \sqrt{N} = \frac{P}{n}\sqrt{\frac{L}{ML'}} \quad \text{(Eq. 3)}$$

In one typical embodiment, L=1 meter, L'=2 mm, M=5, P=10 μm and n=20. According to the foregoing equations, such an image correlation displacement measuring system may contribute an error on the order of approximately 5 microns over a 1 meter measuring range. However, it should be appreciated that, in various embodiments, better accuracy than that indicated by the foregoing equations can be obtained from a correlation displacement measuring system that uses the techniques disclosed in the incorporated '258 and/or '431 patents.

The pixel pitch P establishes the scale factor that is used to determine the image correlation displacement measuring system measurement values along the measuring axis. One factor that may disturb the pixel pitch P is thermal expansion. However, thermal expansion errors may be controlled to levels less than the accumulated error given by EQUATION 3 by temperature control or temperature compensation, or both. Another factor that may, in effect, cause the scale factor to be incorrect along the measuring axis direction is misalignment of the image correlation displacement sensor 180 relative to the measuring axis direction, as described below with reference to FIG. 5.

FIGS. 2A and 2B are diagrams of second and third mounting arrangements 200 and 200' according to this invention. The second mounting arrangement 200 includes an image correlation displacement sensor 280 mounted in conjunction with an encoder readhead 240 and a scale writer 290, all approximately aligned along the measuring axis direction. The scale 230 includes a writable scale track 235 (e.g. a scale track comprising a magnetic or optical recording material, or a material that may be modified by laser marking, or the like), that may be written to by the scale writer 290 (e.g., a scale writer comprising a magnetic recording head, or a controllable laser diode, or a fiber from a controlled remote laser, or the like) in the writing zone 295 and read or sensed by the encoder readhead 240 in the reading zone 245. In some embodiments, the scale track 235 may include a surface and/or markings that are suitable for imaging by the image correlation displacement sensor 280 in an image determining zone 285, provided that such a surface or markings do not disturb the writing or reading abilities of the encoder readhead 240 and the scale writer 290. In other embodiments, the image correlation displacement sensor 280 may have an image determining zone 285", that is aligned along a scale track that is different than the track 235, which may include a surface and/or markings that are suitable for imaging by the image correlation displacement sensor.

The third mounting arrangement 200' shown in FIG. 2B may be understood based on the foregoing description. The third mounting arrangement 200' is analogous to the second mounting arrangement 200, and similarly numbered elements (e.g., 240 and 240') may be similar or identical. It differs from the second mounting arrangement 200 in that the image correlation displacement sensor 280' is mounted at an offset along the y axis direction so that it can be mounted with its image determining zone 285' at the same position along the x-axis direction as the writing zone of the scale writer 290'. Each of the second mounting arrangement 200 and the third mounting arrangement 200' have advantages and disadvantages relative to one another, relative to potential sources of certain dynamic misalignment errors. For example, for small dynamic rotations of a scale or mounting arrangement in the X-Y plane, the second mounting arrangement 200 may provide the best dynamic error rejection. In contrast, for a scale that is not flat (e.g., having portions of varying local inclination in the X-Z plane), the third mounting arrangement 200' may provide the best dynamic error rejection.

Figure 3:
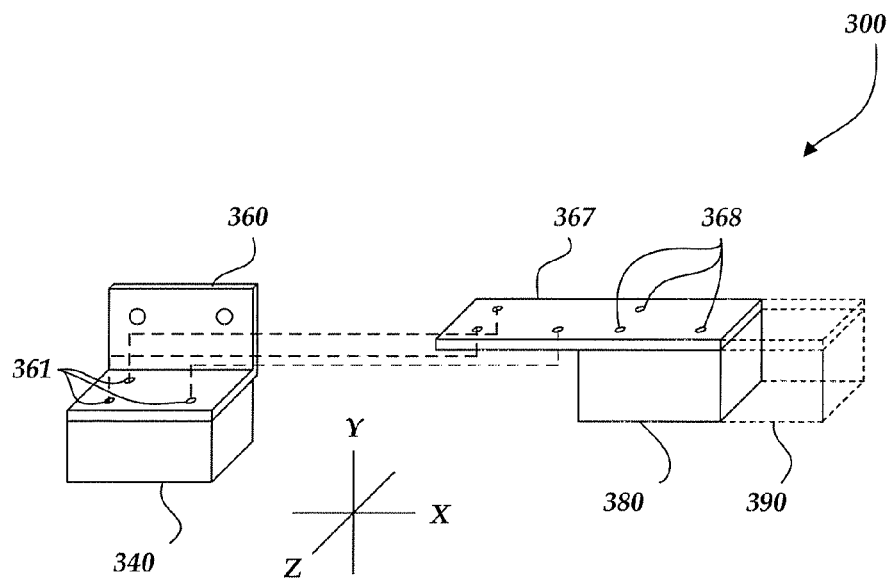
FIG. 3 is a diagram showing a first set of mounting features usable in various embodiments according to this invention.

FIG. 3 is a diagram showing a first set of mounting features 300 usable in various embodiments according to this invention. FIG. 3 shows an encoder readhead 340 mounted to an encoder readhead mounting element 360, which establishes a proper alignment and gap relative to a scale (not shown) that is parallel to the X-Y plane. Another mounting element 367 includes precise aligned mounting features 361 and 368 (which may include conventional mounting elements such as holes, fasteners, alignment pins, or the like) that may be used to temporarily mount an image correlation displacement sensor 380 at a known spacing relative to the encoder readhead 360 and at a proper alignment and gap relative to a surface that provides correlation images as outlined above. In some embodiments, a scale writer 390 may be similarly mounted, as generally indicated in dashed outline.

Figure 4:
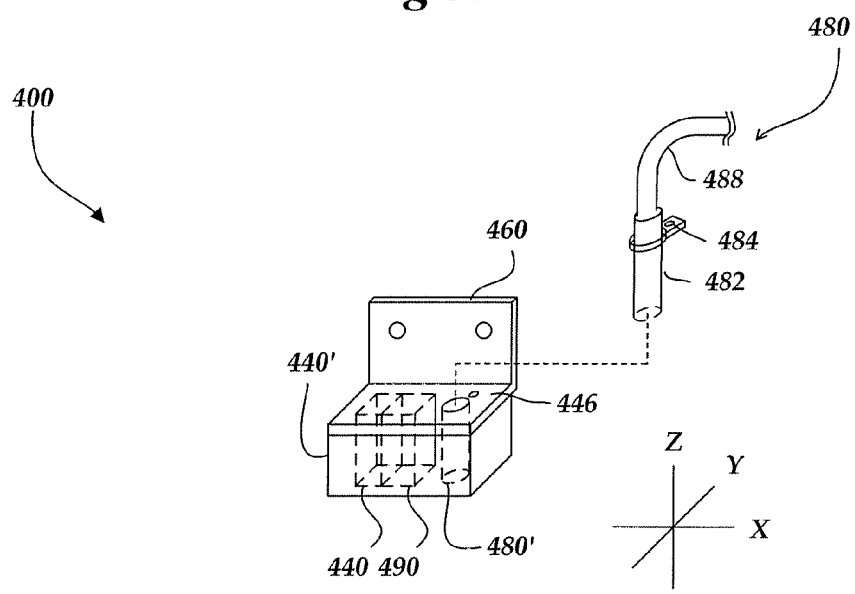
FIG. 4 is a diagram showing a second set of mounting features usable in various embodiments according to this invention.

FIG. 4 is a diagram showing a second set of mounting features 400 usable in various embodiments according to this invention. FIG. 4 shows an encoder readhead housing 440' that permanently houses internal components including an encoder readhead 440 and a scale writer 490 (e.g., an optical readhead and scale writer, or a magnetoresistive readhead and scale writer). The encoder readhead housing 440' is mounted to an encoder readhead mounting element 460, which establishes the internal components at a proper alignment and gap relative to a scale surface (not shown) that is parallel to the X-Y plane. The encoder readhead housing 440' also includes a mounting feature 480' (e.g., a bore) that accepts an imaging element head 482 of an image correlation displacement sensor 480. Precise alignment features 446 and 484 (e.g., a hole and alignment pin or fastener) may be used to temporarily mount the imaging element head 482 in the encoder readhead housing 440' at a known spacing relative to the encoder readhead 440 and the scale writer 490 and at a proper alignment and gap relative to a surface (not shown) that provides correlation images as outlined above. In one embodiment, the imaging element head 482 may comprise imaging optics, an imaging array detector, and all other necessary elements of the image correlation displacement sensor 480. In such an embodiment, an image correlation sensor connection 488 may be identical to the power and signal connection 189 outlined with reference to FIG. 1. In another embodiment, the imaging element head 482 may comprise relay optics that relay image information that depends on the adjacent surface (e.g., a track along the scale, as outlined above) to an image correlation sensor connection 488 that comprises fiber bundle or the like that transfers the image information to a remote image correlation array detector of the image correlation displacement sensor 480. It will be appreciated that embodiments similar to that outlined above with reference to FIG. 4, the mounting features 400 and/or the encoder readhead housing 440' may be made very compactly, if desired. For example, in some embodiments, the encoder readhead housing 440' may have a volume on the order of approximately 4 cubic centimeters, or less, using known magnetoresistive or fiber optic encoder readheads, or the like.

It will be appreciated that in both the first set of mounting features 300 and the second set of mounting features 400, the readhead of the scale-based position encoder or an associated mounting, and the image correlation displacement sensor, include features that allow the image correlation displacement sensor to be readily aligned and temporarily fixed proximate to the mounting position where the readhead of the scale-based position encoder will be used to provide ongoing displacement measurements. In each set of mounting features, the image correlation displacement sensor is attached directly to the scale-based position encoder or the associated mounting, and is not attached to a member of the host system. Thus, no extra alignment procedure is necessary, and no extra features need be added to any member of the host system, in order to accommodate the image correlation displacement sensor.

Figure 5:
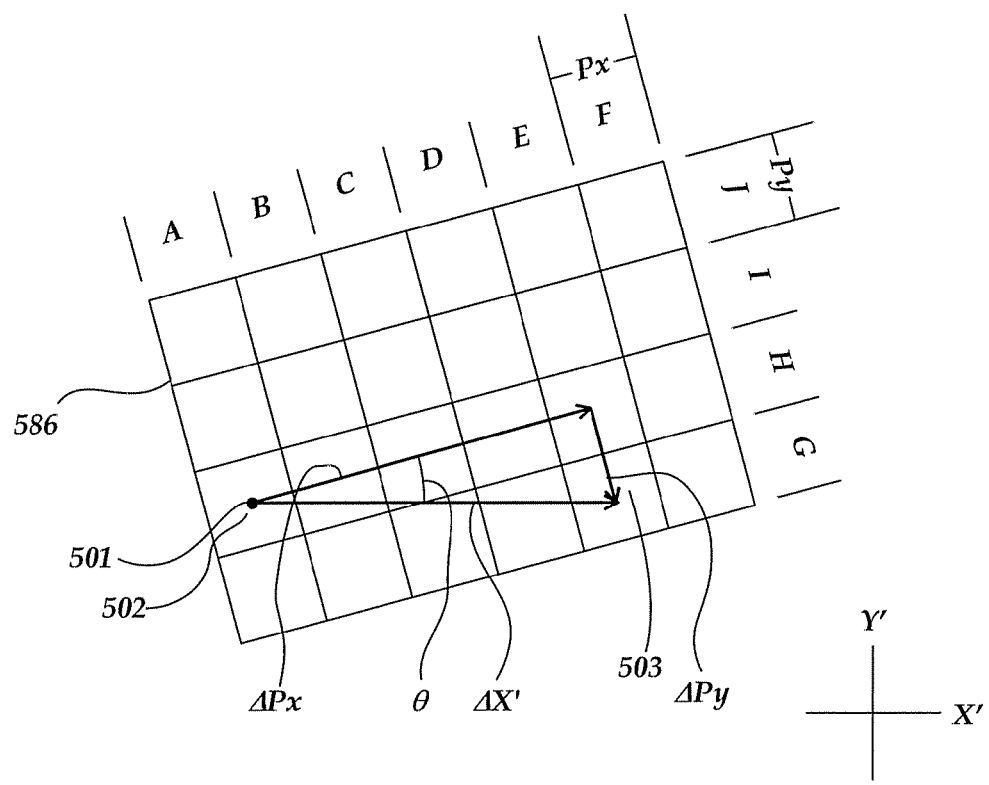
FIG. 5 is a diagram illustrating a first type of error related to misalignment that may be corrected in various embodiments according to this invention.

FIG. 5 is a diagram illustrating a first type of error related to static misalignment that may be detected and corrected in various embodiments according to this invention. As previously indicated, the pixel pitch P, establishes the scale factor that is used to determine the image correlation displacement measuring system measurement values along the measuring axis, and the scale factor may incorrect along the measuring axis direction if the image correlation displacement sensor (e.g., the sensor 180, or the like) is not well aligned relative to the measuring axis direction. FIG. 5 shows a portion of the imaging array 586 of 2-axis image correlation displacement sensor when this case. As shown in FIG. 5, the imaging array 586 is misaligned with respect to the image displacement axis X', which is the measuring axis in the image, by an angle θ. To illustrate the associated potential scale factor error, assume that a reference point 540 is located a pixel position 502 in a first image, and pixel position 503 in a second image. In a 1-axis correlation sensor, an elongated pixel would extend along each of the columns A-F, and it would only be detected that the image feature moved from column A to column E. Only the displacement component ΔPx would be detected, which is approximately $\Delta x'^* \cos \theta$. In contrast, when a 2-axis image correlation sensor is used, corresponding to the 2-axis imaging array 586, both of the displacement components ΔPx and ΔPy can be detected by correlation analysis along the respective x and y axes. Thus, the true image feature displacement Δx' along the measuring axis X' in the image may be accurately calculated by the equation: $\Delta x' = \sqrt{\Delta Px^2 + \Delta Py^2}$ and the true relative displacement of the 2-axis image correlation displacement sensor along the measuring axis of the host system may likewise be accurately determined, despite its misalignment.

It should be appreciated that a 1-axis correlation sensor, or 1-axis encoder, or an interferometer, or the like, cannot automatically detect and correct for its misalignment in this fashion. Over a measuring length of one meter, a misalignment of only 0.18 degrees will cause a measurement error of approximately 5 microns with such 1-axis devices. Therefore, in various embodiments according to this invention, a 2-axis correlation sensor is used to provide this significant advantage when calibrating or writing an encoder scale.

In the embodiments described above, the image correlation displacement sensor (e.g., the image correlation displacement sensor 180, or the like) is generally described as being oriented to "read" along the same direction as the encoder readhead (e.g., the encoder readhead 140, or the like). However, it will be appreciated that the image correlation displacement sensor is not limited to reading a surface of the scale, or a surface parallel to the scale. In some embodiments, the image correlation displacement sensor (or a second image correlation displacement sensor) may be mounted to read a surface that is approximately parallel to XZ plane, for example. In such a case, the techniques outlined above with reference to FIG. 6 may be employed, and various errors related to dynamic gap or tilt variations of the encoder readhead along the XZ plane may also be detected and corrected.

Figure 6:
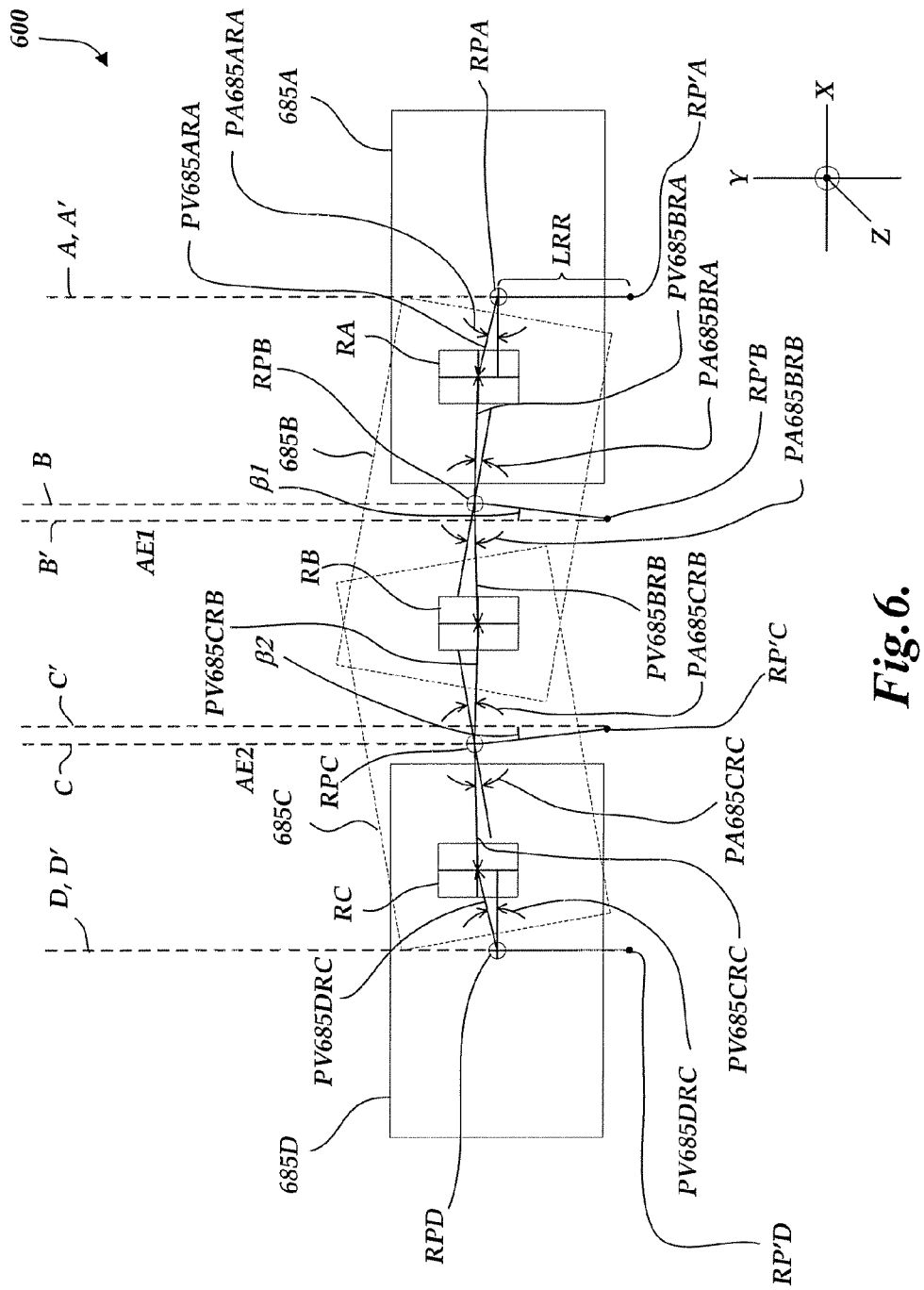
FIG. 6 is a diagram illustrating a second type of error, related to dynamic misalignment, that may be corrected in various embodiments according to this invention.

FIG. 6 is a diagram of an image determining zone sequence 600, illustrating a second type of error, related to dynamic misalignment, which may be corrected in various embodiments according to this invention. It will be understood that the angles shown in FIG. 6 are greatly exaggerated, for purposes of illustration. The sequence 600 may correspond to an embodiment where a scale is attached to a fixed member of a host system and an encoder readhead and an image correlation displacement sensor mounted according to this invention are attached to a relative short member of the host system that moves along the measuring axis direction relative to the fixed member. In such embodiments, it is common for the short member, encoder readhead, and image correlation displacement sensor to have a changing orientation relative to the scale and the measuring axis direction as they move along the measuring axis, for example due to lack of straightness in a bearing track. In such embodiments, the 2-axis image correlation displacement sensor 780 may be used to advantage, as follows.

During one exemplary calibration or writing process according to this invention, a first image determining zone or correlation image frame 685A of an image correlation displacement sensor corresponds to a first relative displacement at a position A between a fixed member and a short member of a host system. As shown in FIG. 6, a first reference portion RA may be defined in the correlation image frame 685A, and its position vector PV685ARA and angle PA685ARA relative to the image frame may be determined or defined. The associated image correlation signal processor (not shown) stores an image of the reference mark portion RA, for recognition and correlation in a subsequent correlation image frame. Next, the image correlation displacement sensor may be used to measure the relative displacement from position A to position B, as outlined previously (e.g., with reference to FIG. 5). At position B, the first reference portion RA may be located in the correlation image frame 685B, and its position vector PV685BRA and angle PA685BRA relative to the image frame 685B may be determined. Thus, the change in orientation of the image correlation displacement sensor between the positions A and B may be known, as well as the apparent distance between the positions A and B. A second reference portion RB is then defined in the correlation image frame 685B, and its position vector PV685BRB and angle PA685BRB relative to the image frame 685B are determined. Next, the image correlation displacement sensor may measure the relative displacement from position B to position C, and the position vector PV685CRB and angle PA685CRB of the second reference portion RB relative to the image frame 685C may be determined. Thus, the change in orientation of the image correlation displacement sensor between the positions B and C may be known, as well as the apparent distance between the positions B and C, and so on for additional relative displacements over the measuring range. Based on a sequence of the foregoing information, a translation and orientation path may be determined that indicates the respective translations and orientations of the 2-axis image correlation displacement sensor at respective positions along the measuring axis. Based on such a translation and orientation path, the average misalignment of the image correlation displacement sensor may be estimated and its scale factor adjusted (e.g., as outlined with reference to FIG. 5), and other errors associated with its dynamic misalignment may be estimated and corrected. Based on the foregoing information, measurements along the direction of the measuring axis may be made more accurate.

It will be appreciated that it may be more appropriate for the host system to be controlled based on the position along the measuring axis of the encoder readhead, or some other reference point that is remote from the image correlation displacement sensor. Based on the determined overall translation path and rotation of the image correlation displacement sensor, the position along the measuring axis of any external reference point that is in a rigid body relationship to the image correlation displacement sensor may be known (e.g., the position of the encoder readhead, or the scale writer, or some other element). Thus, in some embodiments, a calibration or scale writing process according to this invention may include estimating the respective locations of a point that is in a known rigid body relationship relative to the image correlation displacement sensor at various respective positions along the measuring axis, based on the known rigid body relationship and a determined translation and orientation path as outline above. For example, as shown in FIG. 6, the position B' of the remote reference point RP'B along the measuring axis may be estimated based on the determined position B corresponding to the image correlation displacement sensor reference point RPB, the known length $L_{RR}$, and the angle β1, which may be the same as the determined angle PA685BRA. The position C' of the remote reference point RPC' along the measuring axis may be estimated in an analogous manner.

Figure 7:
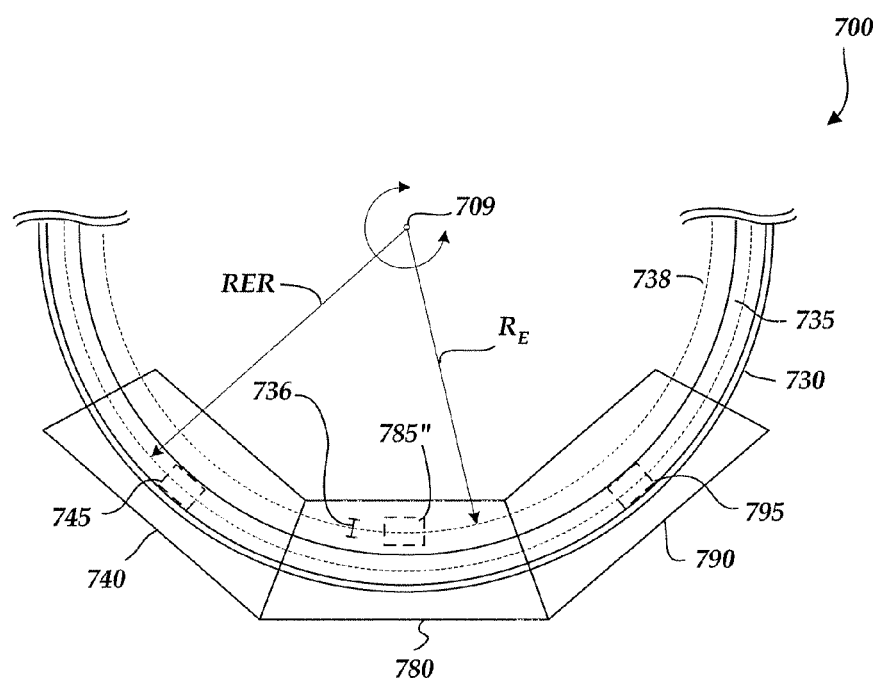
FIG. 7 is a diagram of a fourth embodiment of a mounting arrangement comprising an image correlation displacement sensor correlation encoder mounted in conjunction with a scale-based position encoder and a scale writer in relation to a curving or circular scale.

FIG. 7 is a diagram of fourth embodiment of a mounting arrangement 700 according to this invention comprising a fixed 2-axis image correlation displacement sensor 780 mounted in conjunction with a scale-based position encoder readhead 740 and a scale writer 790, in relation to a curving or circular scale 730 mounted to rotate about a center of rotation 709. The scale 730 includes a writable scale track 735 that may be written to by the scale writer 790 in the writing zone 795 and read or sensed by the encoder readhead 740 in the reading zone 745, at a nominal radius $R_{ER}$ from the center of rotation 709. The image correlation displacement sensor 780 has an image determining zone 785" that is aligned along a track 738 that is different than the track 235, as defined by the nominal radius $R_C$ between the effective center of the image determining zone 785" and the center of rotation 709. In the embodiment shown in FIG. 7, the scale 703 includes at least one prefabricated reference mark 736 that passes through the image determining zone 785". In the embodiment outlined above, the 2-axis image correlation displacement sensor 780 may be used to advantage, as follows.

In general, significant errors may arise in rotary encoders that use prefabricated scale because of eccentricity errors, that is, the actual center of rotation at an end-use installation does not precisely agree with geometric center of the prefabricated scale. In the embodiment shown in FIG. 7, the 2-axis image correlation displacement sensor 780 is of a type that may image the prefabricated reference mark 736. During one exemplary calibration or writing process according to this invention, at a first relative displacement between the moving scale 730 and the fixed elements of the mounting arrangement 700, the reference mark 736 is located in the image determining zone 785", and its position relative the image frame is determined. At that relative displacement the associated image correlation signal processor (not shown) stores that image of the reference mark 736, for recognition and correlation at a later time. Then the scale 730 is displaced through approximately 360 degrees relative to the fixed elements of the mounting arrangement 700, the image correlation displacement sensor 780 determines the accumulated displacement along the track 738, according to previously outlined principles. When the reference mark 736 returns to the image determining zone 785", it is recognized and its position relative the frame is again determined. Based on the foregoing information, the accumulated displacement along the track 738 that corresponds to 360 degrees may be determined with a high degree of accuracy, and used to provide a precise displacement-to-angle conversion relationship (e.g., a displacement-to-degree scale factor), despite the fact that the actual radii $R_C$ and $R_{ER}$ were not previously precisely known. Subsequently, displacement measurement information provided by the image correlation displacement sensor 780 may be used to control the scale writer 790 to mark the scale track 735 any desired angular increment or position.

Although the foregoing description discloses writing scale marks based on the measurement information of the image correlation displacement sensor 780, it will be appreciated that in embodiments where the scale 730 includes prefabricated scale marks along the scale track 735, the scale writer 790 may be omitted and position measurements provided by the image correlation displacement sensor 780 as outlined above may be compared to those provided by the scale-based position encoder including the scale 730 and the encoder readhead 740, in order to calibrate its position measurements approximately as outlined above with reference to FIG. 1, which may eliminate eccentricity errors, for example.

Figure 8:
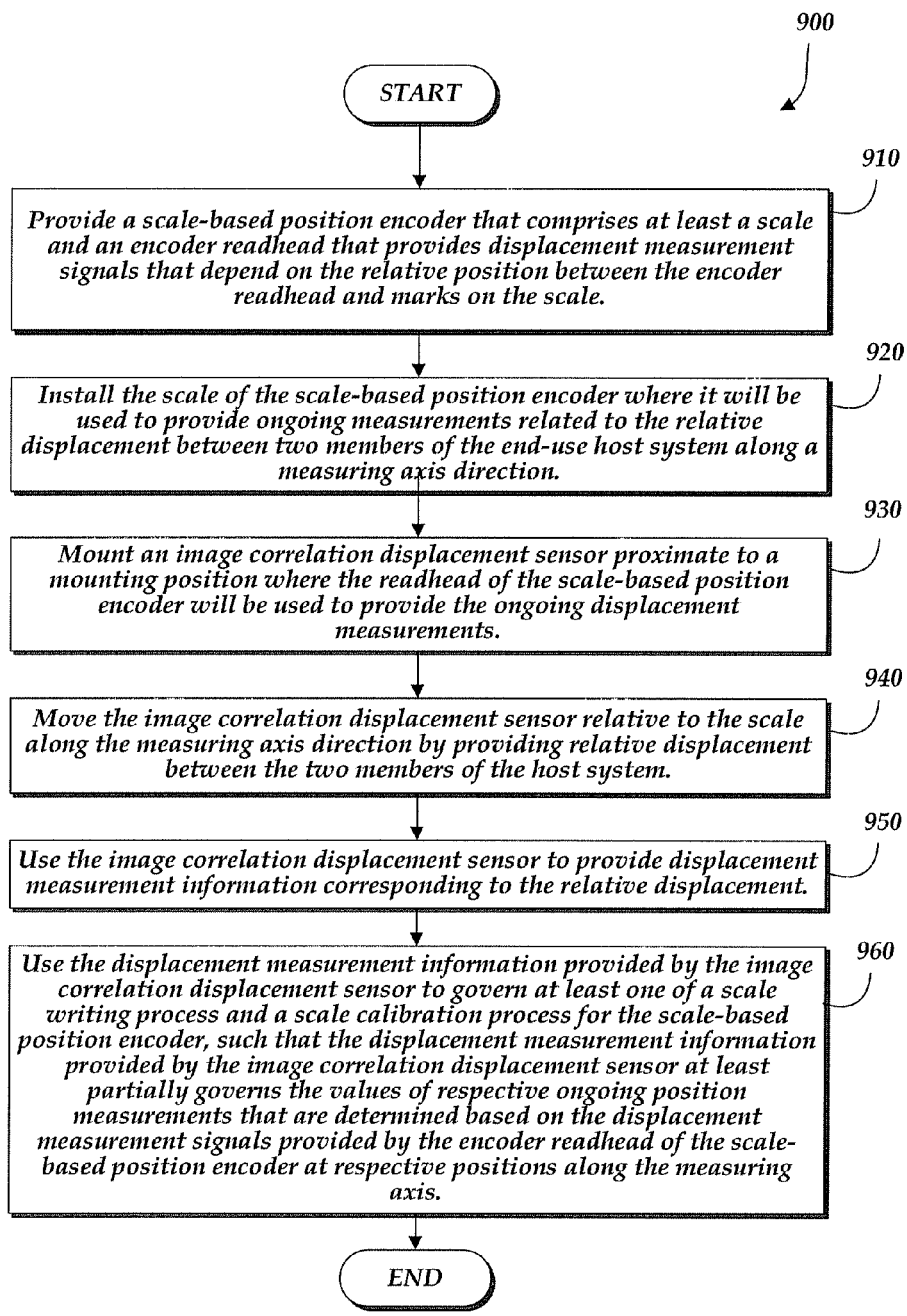
FIG. 8 is a flow diagram illustrating one exemplary embodiment of a routine according to this invention for performing operations for writing or calibrating an encoder scale at an end-use installation.

FIG. 8 is a flow diagram illustrating one exemplary embodiment of a routine 900 for performing operations for writing or calibrating an encoder scale at an end-use installation according to this invention. The routine starts, and at a block 910 a scale-based position encoder is provided that comprises at least a scale and an encoder readhead that provides displacement measurement signals that depend on the relative position between the encoder readhead and marks on the scale.

At a block 920, the scale of the scale-based position encoder is installed where it will be used to provide ongoing measurements of the relative displacement between two members of a host system along a measuring axis direction.

At a block 930, an image correlation displacement sensor is mounted (e.g., temporarily mounted) proximate to a mounting position where the encoder readhead of the scale-based position encoder will be used to provide the ongoing displacement measurements. In various embodiments the encoder readhead may actually be present (e.g., as described in various embodiments above), and some embodiments, particularly those where the scale is to be written, rather than calibrated, the encoder readhead may be mounted at a later time.

At a block 940, the image correlation displacement sensor is moved relative to the scale along the measuring axis direction by providing relative displacement between the two members of the host system (e.g., manually, or by using a motion controller of the host system).

At a block 950, the image correlation displacement sensor is used to provide displacement measurement information corresponding to the relative displacement.

At a block 960, the displacement measurement information provided by the image correlation displacement sensor is used to govern at least one of a scale writing process and a scale calibration process for the scale-based position encoder, such that the displacement measurement information at least partially governs the values of respective ongoing displacement measurements that are determined based on the displacement measurement signals provided by the scale-based position encoder at respective positions along the measuring axis.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for writing or calibrating the scale of a scale-based position encoder mounted on an end-use host system, using an image correlation displacement sensor, the method comprising:

providing a scale-based position encoder that comprises at least a scale and an encoder readhead that provides displacement measurement signals that depend on the relative position between the encoder readhead and marks on the scale;

installing the scale of the scale-based position encoder where it will be used to provide ongoing position measurements related to the relative displacement between two members of the end-use host system along a measuring axis direction;

mounting an image correlation displacement sensor proximate to a mounting position where the encoder readhead of the scale-based position encoder will be used to provide the ongoing position measurements;

moving the image correlation displacement sensor relative to the scale along the measuring axis direction by providing relative displacement between the two members of the host system; and using the image correlation displacement sensor to provide displacement measurement information corresponding to the relative displacement, using the displacement measurement information provided by the image correlation displacement sensor to govern at least one of a scale writing process and a scale calibration process for the scale-based position encoder, such that the displacement measurement information provided by the image correlation displacement sensor at least partially governs the values of respective ongoing position measurements that are determined based on the displacement measurement signals provided by the encoder readhead of the scale-based position encoder at respective positions along the measuring axis.

2. The method of claim 1, wherein:

providing the scale-based position encoder comprises providing a scale that includes a writable scale track; and the displacement measurement information provided by the image correlation displacement sensor is used to govern a scale writing process.

3. The method of claim 2, further comprising:

mounting a scale writer proximate to the scale and proximate to the mounting position where the encoder readhead of the scale-based position encoder will be used to provide the ongoing displacement measurements; and using the displacement measurement information provided by the image correlation displacement sensor to govern the location of marks written by the scale writer during the scale writing process.

4. The method of claim 1, wherein the displacement measurement information provided by the image correlation displacement sensor is used to govern a scale calibration process, and the method further comprises:

determining calibration information based at least partially on the displacement measurement information provided by the image correlation displacement sensor, wherein the calibration information is usable to correct respective raw position measurements that are determined based on the displacement measurement signals provided by the encoder readhead at respective positions along the measuring axis, in order to provide corrected values for respective ongoing position measurements corresponding to the respective positions; and storing the calibration information in a calibration memory associated with the scale-based position encoder such that the stored calibration information may be used to provide corrected values for respective ongoing position measurements corresponding to respective positions along the measuring axis.

5. The method of claim 4, wherein the method comprises:

installing the encoder readhead of the scale-based displacement encoder where it will be used to provide ongoing position measurements related to the relative displacement between two members of the end-use host system;

moving the image correlation displacement sensor and the encoder readhead simultaneously relative to the scale during the relative displacement and using the encoder readhead to provide displacement measurement signals corresponding to the relative displacement; and determining the calibration information based on the displacement measurement information provided by the image correlation displacement sensor and based on the displacement measurement signals provided by the encoder readhead.

6. The method of claim 5, wherein providing the scale-based position encoder comprises providing a scale that includes a plurality of prefabricated marks along the measuring axis direction that determine the displacement measurement signals provided by the scale-based position encoder readhead.

7. The method of claim 1, wherein the image correlation displacement sensor is a 2-axis image correlation displacement sensor.

8. The method of claim 7, comprising using the image correlation displacement sensor to provide at least one of one of speckle images and real images of a surface.

9. The method of claim 8, comprising using the image correlation displacement sensor to provide speckle images at one time and real images of a surface at another time.

10. The method of claim 7, wherein providing the scale-based position encoder comprises providing a scale including a circular scale track that provides a circular measuring axis direction.

11. The method of claim 10, further comprising:
using the image correlation displacement sensor to provide a first real image of a reference mark located on the scale at the start of a relative displacement of approximately 360 degrees of rotation;
rotating the scale approximately 360 degrees beginning from the location of the first real image, in order to move the image correlation displacement sensor relative to the scale along the measuring axis direction, and using the image correlation displacement sensor to provide displacement measurement information corresponding to the approximately 360 degrees of rotation;
using the image correlation displacement sensor to provide a second real image of the reference mark located on the scale at the end of the relative displacement of approximately 360 degrees of rotation;
determining the location of the reference mark in the first and second real images;
using displacement measurement information corresponding to the approximately 360 degrees of rotation, and the location of the reference mark in the first and second real images to determine a displacement-to-angle conversion relationship between the amount of displacement as indicated by the displacement measurement information provided by the image correlation displacement and the corresponding amount of rotation of the scale; and
using the displacement-to-angle conversion relationship along with displacement measurement information provided by the image correlation displacement sensor to govern at least one of a scale writing process and a scale calibration process for the scale-based position encoder.

12. The method of claim 7, comprising:
providing 2-axis displacement measurement information from the 2-axis image correlation displacement sensor during the relative displacement and determining displacements along the measuring axis direction based on the 2-axis displacement measurement information, such that the 2-axis image correlation displacement sensor need not be precisely aligned with the measuring axis direction in order to provide accurate displacement measurements along the measuring axis direction.

13. The method of claim 7, wherein providing the scale-based position encoder comprises providing a scale that includes prefabricating markings, and the method comprises:
using the image correlation displacement sensor to provide real images of the prefabricating markings; and
using the real images of the prefabricating markings for at least one of determining correlation measurements, determining a relative orientation between the image correlation displacement sensor and the prefabricating markings, determining a change in the relative orientation between the image correlation displacement sensor and the prefabricating markings, determining a repeatability of the displacement measurement information provided by the axis image correlation displacement sensor, determining an accumulated error associated with the displacement measurement information provided by the image correlation displacement sensor, and reducing an accumulated error associated with the displacement measurement information provided by the axis image correlation displacement sensor.

14. The method of claim 7, comprising:
providing 2-axis displacement measurement information from the 2-axis image correlation displacement sensor during the relative displacement and based on the 2-axis displacement measurement information determining a translation and orientation path of the 2-axis image correlation displacement sensor corresponding to the relative displacement, the translation and orientation path indicative of respective translations and orientations of the 2-axis image correlation displacement sensor at respective positions along the measuring axis; and
governing at least one of a scale writing process and a scale calibration process for the scale-based position encoder based at least partly on information determined based on the translation and orientation path.

15. The method of claim 14, comprising:
determining respective estimated locations of a point that is in a known rigid body relationship relative to the 2-axis image correlation displacement sensor, the respective estimated locations of the point corresponding to respective positions along the measuring axis; and
governing the at least one of a scale writing process and a scale calibration process based at least partly on the respective estimated locations of the point corresponding to respective positions along the measuring axis.

16. The method of claim 7, wherein:
image correlation displacement sensor mounting features are included on at least one of the encoder readhead of the scale-based position encoder and a mounting element used to mount the encoder readhead to the host system, mating mounting features are included on at least one of the image correlation displacement sensor and a mounting element used to mount the image correlation displacement sensor; and
mounting the image correlation displacement sensor proximate to the mounting position where the encoder readhead of the scale-based position encoder will be used to provide the ongoing position measurements comprises using the mounting features and the mating mounting features to temporarily align and fix the image correlation displacement sensor, without attaching the image correlation displacement sensor directly to a member of the host system.

* * * * *

UNITED STATES PATENT AND TRADEMARK OFFICE
CERTIFICATE OF CORRECTION

PATENT NO. : 7,432,496 B1
APPLICATION NO. : 11/829715
DATED : October 7, 2008
INVENTOR(S) : M. Nahum et al.

It is certified that error appears in the above-identified patent and that said Letters Patent is hereby corrected as shown below:

| COLUMN | LINE | ERROR |
|---|---|---|
| On the title Page item (73) | Assignee | "Mitotoyo Corporation," should read --Mitutoyo Corporation,-- |
| 13 (Claim 1, | 65 lines 32-33) | "ongo-ing" should break --on-going-- |
| 14 (Claim 8, | 66-67 lines 2-3) | delete the second occurrence of "one of" |

Signed and Sealed this

Twenty-first Day of July, 2009

JOHN DOLL
*Acting Director of the United States Patent and Trademark Office*